(12) United States Patent
Roh et al.

(10) Patent No.: US 11,480,234 B2
(45) Date of Patent: Oct. 25, 2022

(54) STRUCTURE AND METHOD FOR BELT INSTALLATION OF AN ENGINE FOR A VEHICLE

(71) Applicants: Hyundai Motor Company, Seoul (KR); Kia Motors Corporation, Seoul (KR)

(72) Inventors: Tae Hoon Roh, Seoul (KR); Hyun Jeong Baek, Busan (KR); Sung Kwang Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 359 days.

(21) Appl. No.: 16/667,365

(22) Filed: Oct. 29, 2019

(65) Prior Publication Data
US 2021/0003197 A1    Jan. 7, 2021

(30) Foreign Application Priority Data
Jul. 3, 2019    (KR) .......................... 10-2019-0079790

(51) Int. Cl.
| | |
|---|---|
| *F16H 7/24* | (2006.01) |
| *F16H 7/02* | (2006.01) |
| *F16G 1/04* | (2006.01) |
| *F16H 55/36* | (2006.01) |

(52) U.S. Cl.
CPC .............. *F16H 7/24* (2013.01); *F16G 1/04* (2013.01); *F16H 7/02* (2013.01); *F16H 55/36* (2013.01); *F16H 2055/366* (2013.01)

(58) Field of Classification Search
CPC ... F16H 7/24; F16H 55/49; F16H 7/18; Y10T 29/53974
USPC ................................................... 474/130, 119
See application file for complete search history.

(56) References Cited

U.S. PATENT DOCUMENTS

| | | | | |
|---|---|---|---|---|
| 680,063 | A * | 8/1901 | Montgomery ............ | F16H 7/24 474/130 |
| 1,158,737 | A * | 11/1915 | Spangelo .................. | F16H 7/24 474/130 |
| 1,755,876 | A * | 4/1930 | Homstead ................. | F16H 7/24 474/130 |
| 2,195,359 | A * | 3/1940 | Coe ........................... | F16H 7/24 474/130 |
| 2,553,439 | A * | 5/1951 | Carmichael ............... | F16H 7/02 474/167 |
| 2,615,345 | A * | 10/1952 | Ross ......................... | F16H 7/24 474/130 |
| 2,621,529 | A * | 12/1952 | Hawkins ................... | F16H 7/24 474/130 |
| 2,913,915 | A * | 11/1959 | Russpaule ................ | F16H 55/46 474/120 |

(Continued)

*Primary Examiner* — Henry Y Liu
(74) *Attorney, Agent, or Firm* — Fox Rothschild LLP

(57) ABSTRACT

A structure for belt installation of an engine for a vehicle is provided. The structure includes a damper pulley that is mounted to a crankshaft of the engine and a stretch belt that has a first end mounted on the damper pulley and a second end connected to an upper portion of a pulley portion of an accessory. The accessory is mounted on the engine at a position spaced apart from the damper pulley. The pulley portion includes a guide member on a front center thereof which guides installation of the stretch belt to the pulley portion.

7 Claims, 4 Drawing Sheets

(56) References Cited

U.S. PATENT DOCUMENTS

| | | | | |
|---|---|---|---|---|
| 2,924,109 A * | 2/1960 | Carriveau | F16H 7/24 | 29/270 |
| 3,138,963 A * | 6/1964 | Prince | F16H 7/24 | 29/700 |
| 4,109,544 A * | 8/1978 | Clark | F16H 7/24 | 474/130 |
| 4,111,063 A * | 9/1978 | Journey | F16H 7/24 | 474/130 |
| 4,193,310 A * | 3/1980 | Boyer | D06F 58/08 | 384/417 |
| 4,929,219 A * | 5/1990 | Baker | H02K 7/1004 | 474/107 |
| 6,402,649 B1 * | 6/2002 | Amkreutz | F16H 7/24 | 474/130 |
| 6,565,467 B2 * | 5/2003 | Amkreutz | F16H 7/24 | 474/130 |
| 6,692,391 B2 * | 2/2004 | Gerring | F16H 7/24 | 254/250 |
| D492,579 S * | 7/2004 | Hodjat | D8/360 | |
| 6,783,473 B2 * | 8/2004 | De Meester | F16H 7/24 | 474/130 |
| 7,204,774 B2 * | 4/2007 | Dohogne | D06F 58/08 | 474/168 |
| 7,211,015 B2 * | 5/2007 | Shaw | F16H 7/24 | 474/130 |
| 7,247,110 B2 * | 7/2007 | Winninger | F16H 7/24 | 474/130 |
| 7,699,734 B2 * | 4/2010 | Lohrentz | A01D 69/00 | 474/119 |
| 8,241,159 B2 * | 8/2012 | Iwata | B25B 27/0035 | 474/130 |
| 8,397,363 B2 * | 3/2013 | Fukatani | F16H 7/24 | 269/1 |
| 8,684,871 B2 * | 4/2014 | Mitchell | F16H 7/24 | 474/130 |
| 8,753,238 B2 * | 6/2014 | Kunisada | F16H 7/24 | 474/130 |
| 9,009,936 B2 * | 4/2015 | Kunisada | F16H 7/08 | 29/700 |
| 9,057,422 B2 * | 6/2015 | Kurtz | F16H 7/24 | |
| 9,739,350 B2 * | 8/2017 | Maruyama | F16H 7/24 | |
| 9,915,326 B2 * | 3/2018 | Aoki | F16H 7/24 | |
| 10,385,947 B2 * | 8/2019 | Aoki | F16H 7/24 | |
| 10,415,686 B2 * | 9/2019 | Sivanandan | F16H 55/49 | |
| 11,193,572 B2 * | 12/2021 | Grabill | F16H 55/44 | |
| 2002/0162627 A1 * | 11/2002 | Dunlap | C08J 3/244 | 156/330.9 |
| 2003/0176248 A1 * | 9/2003 | De Meester | F16H 7/24 | 474/130 |
| 2003/0211910 A1 * | 11/2003 | Gerring | F16H 7/24 | 474/130 |
| 2004/0002400 A1 * | 1/2004 | Ellis | F16H 7/24 | 474/130 |
| 2004/0063530 A1 * | 4/2004 | De Meester | F16H 7/24 | 474/130 |
| 2005/0164815 A1 * | 7/2005 | Winninger | F16H 7/24 | 474/130 |
| 2005/0170923 A1 * | 8/2005 | Hodjat | F16H 7/24 | 474/130 |
| 2005/0221934 A1 * | 10/2005 | Shaw | F16H 7/24 | 474/130 |
| 2005/0233848 A1 * | 10/2005 | Uehara | F16H 55/48 | 474/69 |
| 2006/0293137 A1 * | 12/2006 | Lopes | F16H 55/49 | 474/166 |
| 2008/0155803 A1 * | 7/2008 | Iwata | F16H 7/24 | 29/281.4 |
| 2010/0048335 A1 * | 2/2010 | Debuire | F16H 7/24 | 474/130 |
| 2010/0125995 A1 * | 5/2010 | Fukatani | F16H 7/24 | 29/270 |
| 2012/0040791 A1 * | 2/2012 | Mitchell | F16H 7/24 | 474/119 |
| 2013/0081241 A1 * | 4/2013 | Kunisada | F16H 7/24 | 29/235 |
| 2014/0274509 A1 * | 9/2014 | Kunisada | F16H 7/24 | 474/101 |
| 2016/0138686 A1 * | 5/2016 | Aoki | F16H 7/24 | 474/119 |
| 2017/0211665 A1 * | 7/2017 | Aoki | F16H 7/24 | |
| 2019/0376592 A1 * | 12/2019 | Grabill | F02B 67/06 | |

* cited by examiner

STRUCTURE AND METHOD FOR BELT INSTALLATION OF AN ENGINE FOR A VEHICLE

CROSS-REFERENCE TO RELATED APPLICATION

This application claims priority to and the benefit of Korean Patent Application No. 10-2019-0079790 filed on Jul. 3, 2019, the entire contents of which are incorporated herein by reference.

BACKGROUND

(a) Field of the Invention

The present invention relates to structure and method for belt installation of an engine for a vehicle.

(b) Description of the Related Art

In general, engines used in automobiles and the like are provided with auxiliary devices (hereinafter referred to as accessories) operated by a belt to properly operate the vehicle. These accessories include starters, generators, power steering, air conditioners, compressors, and pumps. A damper pulley is mounted on the crankshaft of the vehicle and the various pulleys of the accessories are wound by a minimal number of belts, e.g., a single belt.

To properly maintain the tension of the belt, a tensioner is used, and the tensioner is applied in various ways such as mechanical and hydraulic. Meanwhile, instead of using a tensioner, a stretch belt may be applied between the damper pulley and a pulley of an accessory such as the air-conditioner compressor, to maintain the tension without the tensioner.

In other words, the stretch belt is capable of maintaining tension without a separate tensioner, and has a greater elasticity than a general belt. When the stretch belt has a low tension, it may be assembled using a separate jig, but this may be disadvantageous in assembly and may cause quality problems such as tearing of the stretch belt. In addition, in the stretch belt, an eccentric idler is typically employed to improve easiness of assembling, however, this may increase workload for installing the stretch belt.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide structure and method for belt installation of an engine for a vehicle, having advantages of improved installation without employing an extra tension device.

An exemplary structure for belt installation of an engine for a vehicle may include a damper pulley mounted to a crankshaft of the engine, a stretch belt having a first end mounted on the damper pulley, and an accessory mounted on the engine at a position spaced apart from the damper pulley, having a pulley portion mounted with a guide member on a front center, the guide member guiding installation of the stretch belt to the pulley portion.

The guide member may have a same rotation center with the accessory. The guide member may also include a protrusion part that extends in a circular ring shape at the front center of the accessory, and a flange part integrally formed with and extending outward along a rear outer circumference of the protrusion part, and contacting the accessory. The protrusion part may have a protrusion width that extends from the front center of the accessory that is greater than about 0.5 times and less than a width of the stretch belt.

An outer diameter of the protrusion part may be between about 0.6 times and 0.7 times a diameter of the pulley portion of the accessory. The guide member may include a plurality of bolt fastening bores formed along a circumference of the flange part and radially protruding from an outer circumference of the flange part. Additionally, the guide member may extend inward along a rear inner circumference of the protrusion part and may be coupled to the accessory by a cover. The stretch belt may include a core wire within an outer shell, and the core wire may be made of an elastic fiber having elasticity.

An exemplary method for belt installation of an engine for a vehicle, may include mounting a guide member to a front center portion of an accessory to be connected to a damper pulley mounted on a crankshaft of the engine by a stretch belt, mounting a first end of the stretch belt on the damper pulley, mounting an upper portion of a second end of the stretch belt to an upper portion of a pulley portion of the accessory and spanning a lower portion of the second end of the stretch belt to a lower portion of the guide member, and rotating the damper pulley.

In mounting a guide member to a front center portion of an accessory, the guide member may be mounted to a front center of the accessory such that the guide member has a same rotation center with the accessory. Additionally, in mounting a guide member to a front center portion of an accessory, the guide member may be coupled to the accessory by a plurality of bolt fastening parts.

In mounting a lower portion of the second end of the stretch belt to a lower portion of the guide member, the lower portion of the second end of the stretch belt may be mounted to a lower circumference of a protrusion part of the guide member. By the rotation of the damper pulley, an installed range of the lower portion of the second end of the stretch belt to the pulley portion of the accessory may increase. The stretch belt may include a core wire within an outer shell, and the core wire may be made of an elastic fiber having elasticity.

According to structure and method for belt installation of an engine for a vehicle according to an exemplary embodiment, a stretch belt having high tension may be installed more easily when an accessory of the engine is connected to the damper pulley mounted on the crankshaft of the engine by the stretch belt.

In addition, the structure and method for belt installation of an engine for a vehicle may be applicable any accessory to be connected by a stretch belt. Further, effects that may be obtained or expected from exemplary embodiments of the present invention are directly or suggestively described in the following detailed description. In other words, various effects expected from exemplary embodiments of the present invention will be described in the following detailed description.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
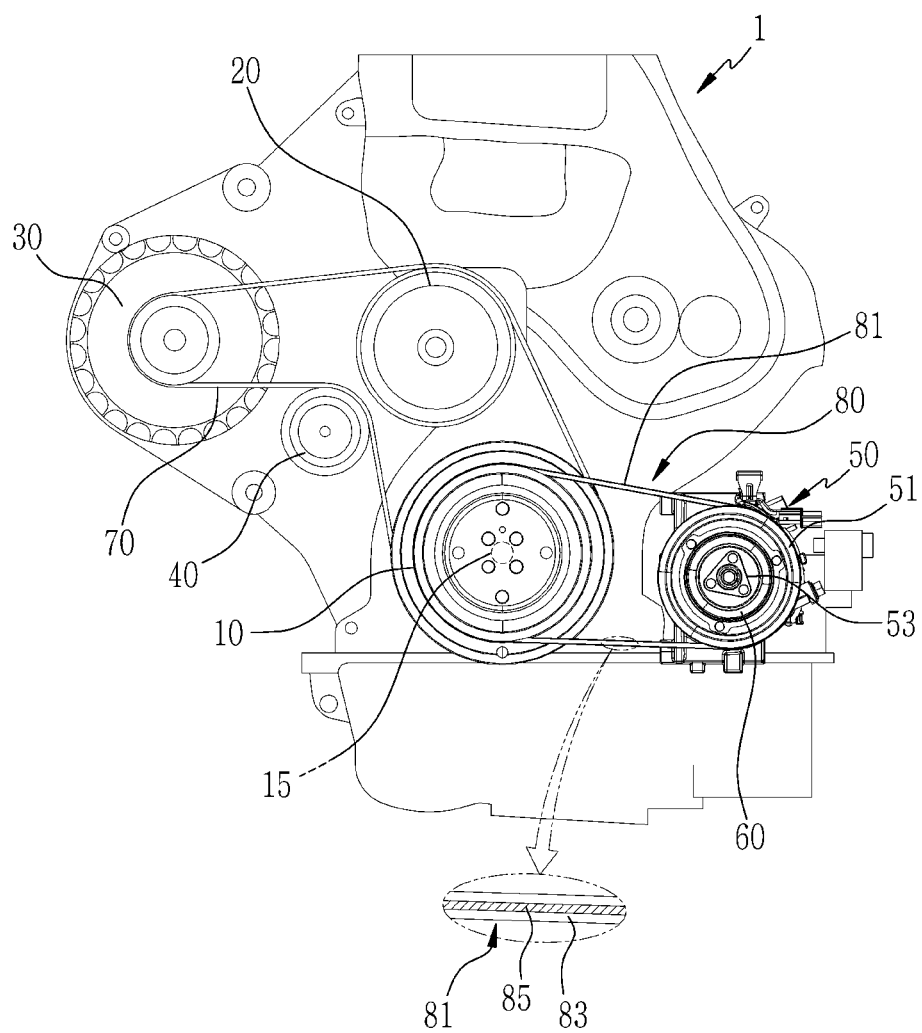
FIG. 1 is a schematic diagram of an engine applied with structure and method for belt installation of an engine for a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

The drawings and description are to be regarded as illustrative in nature and not restrictive, and like reference numerals designate like elements throughout the specification. In the following description, dividing names of components into first, second and the like is to divide the names because the names of the components are the same as each other and an order thereof is not particularly limited.

Figure 2:
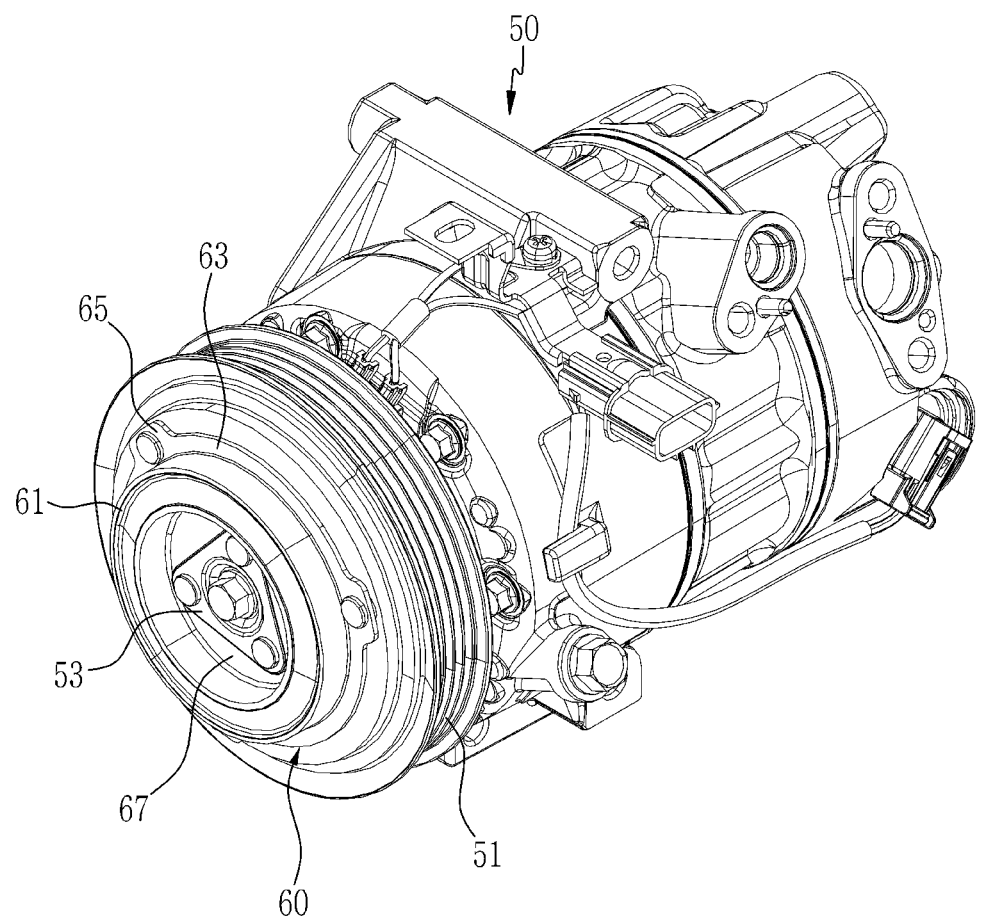
FIG. 2 is a perspective view of an air-conditioner compressor applied with structure and method for belt installation of an engine for a vehicle according to an exemplary embodiment.
Figure 3:
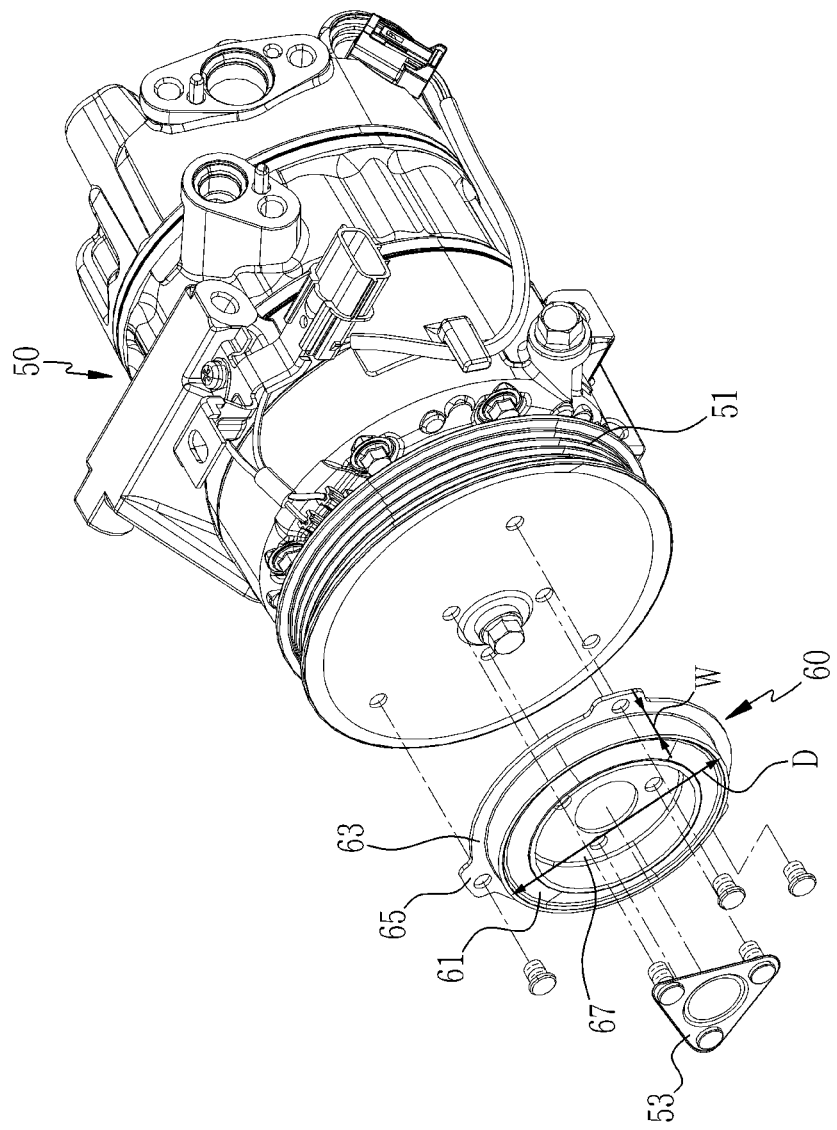
FIG. 3 is an exploded perspective view of FIG. 2 according to an exemplary embodiment.
Figure 4:
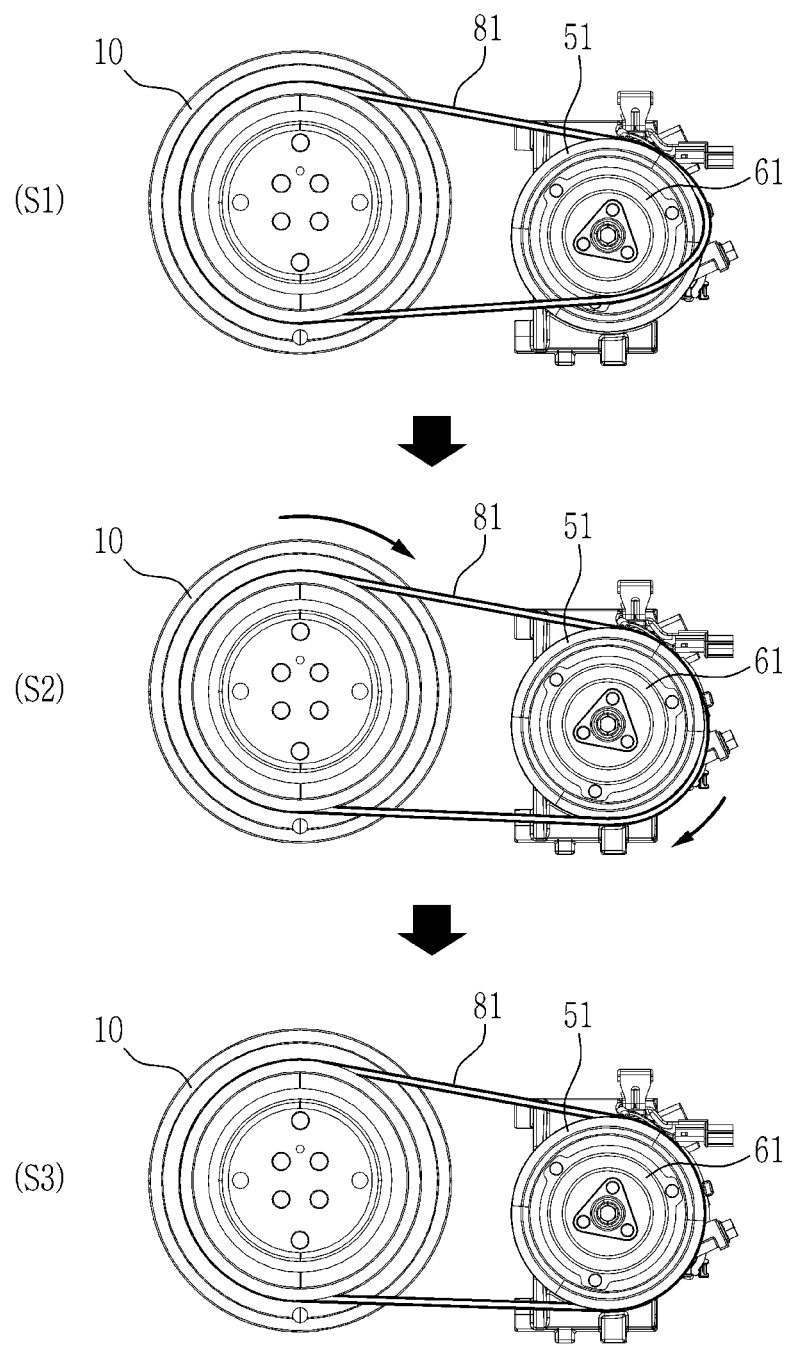
FIG. 4 is a diagram illustrating a method for belt installation of an engine for a vehicle according to an exemplary embodiment.

FIG. 1 is a schematic diagram of an engine applied with structure and method for belt installation of an engine for a vehicle according to an exemplary embodiment. FIG. 2 is a perspective view of an air-conditioner compressor applied with structure and method for belt installation of an engine for a vehicle according to an exemplary embodiment. FIG. 3 is an exploded perspective view of FIG. 2. FIG. 4 is a diagram illustrating a method for belt installation of an engine for a vehicle according to an exemplary embodiment.

Referring to FIG. 1, structure and method for belt installation of an engine for a vehicle according to an exemplary embodiment is described with reference to a vehicle of a mild-hybrid type. It may be understood that the structure and method for belt installation of an engine for a vehicle according to an exemplary embodiment may be applied, not only to the mild-hybrid type vehicle but also to any type of vehicle that employs a stretch belt 81 to install an accessory, e.g., an air-conditioner compressor, to an engine 1.

In other words, the exemplified structure and method for belt installation of an engine for a vehicle may be applied to any accessory mounted to the engine 1 by the stretch belt 81. The stretch belt 81 refers to a belt in which a core wire 85 within an outer shell 83 is made of an elastic fiber having elasticity. A stretch belt 81 applied with such elastic fiber may generate a tension without a separate tensioner 40 used to install another accessory.

The engine 1, e.g., of a mild-hybrid type, applied with structure and method for belt installation of an engine for a vehicle according to an exemplary embodiment may include a damper pulley 10, a water pump 20, a mild-hybrid integrated starter-generator 30, and an air-conditioner compressor 50. The damper pulley 10 may be mounted on a crankshaft (not shown) disposed in the cylinder block (not shown). The water pump 20 may be mounted to the engine 1 at a position spaced upwardly from the damper pulley 10.

The mild-hybrid integrated starter-generator 30 may be mounted to the engine 1 at a position spaced apart from the water pump 20 in a width direction of the engine 1. The mild-hybrid integrated starter-generator 30 may be configured to start the engine 1 or generate electricity by the output of the engine 1. The damper pulley 10, the water pump 20, and the mild-hybrid integrated starter-generator 30 may be connected to each other via a first belt 70.

The first belt 70 may interconnect the damper pulley 10, the mild-hybrid integrated starter-generator 30, and the water pump 20. In particular, the engine 1 may include a tensioner 40 to adjust the tension of the first belt 70. The tensioner 40 may be disposed between the water pump 20 and the mild-hybrid integrated starter-generator 30 to adjust the tension of the first belt 70. The number and position of the tensioner 40 may be varied.

The air-conditioner compressor 50 may be mounted to the engine 1 at a position spaced apart from the damper pulley 10. Particularly, the air-conditioner compressor 50 may be mounted to the engine 1 on an opposite side of the mild-hybrid integrated starter-generator 30 with respect to the damper pulley 10. The damper pulley 10 and the air-conditioner compressor 50 may be connected via a second belt 80.

The second belt 80 may be employed separately from the first belt 70 and may interconnect the damper pulley 10 and the air-conditioner compressor 50 and thus, the torque of a crankshaft 15 and the torque of the mild-hybrid integrated starter-generator 30 may be transmitted to the air-conditioner compressor 50. In particular, the air-conditioner compressor 50 may include the pulley portion 51 mounted at a front side of the air-conditioner compressor 50, as shown in FIG. 1 and FIG. 2.

The air-conditioner compressor 50 may be as known in the art except the pulley portion 51, and will not be described in further detail. Through the first belt 70 and the second belt 80, the torque of the crankshaft 15 of the engine 1 and the torque of the mild-hybrid integrated starter-generator 30 may be transmitted to the water pump 20 and/or the air-conditioner compressor 50, based on driving condition of the vehicle.

The second belt 80 may be formed as a stretch belt 81. The stretch belt 81 may connect the damper pulley 10 and the air-conditioner compressor 50 in an endless track scheme. In particular, a first end of the stretch belt 81 may be connected to the damper pulley 10, and a second end of the stretch belt 81 may be connected to the air-conditioner compressor 50. The stretch belt 81 is a belt having tension or elasticity, and may be used without employing a tensioner, e.g., a tensioner 40 applied between the damper pulley 10 and the mild-hybrid integrated starter-generator 30 employed for adjusting the tension of the first belt 70.

In addition, the stretch belt 81 for connecting the damper pulley 10 and the air-conditioner compressor 50 typically provides a substantial amount of tension, and thus it is not easy to install the stretch belt 81. For easier installation of the second belt 81 formed as the stretch belt, an exemplary structure for belt installation of an engine for a vehicle includes a guide member 60 mounted to the front center portion of the air-conditioner compressor 50, as shown in FIG. 1.

Referring to FIG. 2 and FIG. 3, the guide member 60 may include a protrusion part 61, a flange part 63, a bolt fastening part 65, and an overlap part 67, and may be fixed, e.g., welded or mechanically fastened, to the accessory, e.g., the air-conditioner compressor 50.

The protrusion part 61 may protrude or extend in a circular ring shape at the front center portion of the air-conditioner compressor 50. The protrusion part 61 may have a protrusion width W that protrudes or extends from the front side of the air-conditioner compressor 50 that is greater than about 0.5 times the width of the stretch belt 81 and less than the width of the stretch belt 81.

In other words, the protrusion part 61 may be sized wider than about 0.5 times of the width of the stretch belt 81 and thus, the stretch belt 81 may be caught by the protrusion part 61 while sized narrower than the width of the stretch belt 81 to prevent interference with other components. An outer diameter D of the protrusion part 61 may be between about 0.6 times and 0.7 times of a diameter of the pulley portion of the air-conditioner compressor 50.

The flange part 63 may extend outward along a rear outer circumference of the protrusion part 61 and may be formed integrally with the protrusion part 61. The flange part 63 may be formed in a plate shape and may contact the front surface of the air-conditioner compressor 50. The guide member 60 may be welded to the front surface of the air-conditioner compressor 50 through the flange part 63. Alternatively, the guide member 60 may be mechanically coupled to the air-conditioner compressor 50 through bolt fastening parts 65 formed along the circumference of the flange part 63 and radially protruding from outer circumference of the flange part 63.

Although drawings exemplarily illustrates that three bolt fastening bores to receive fastening bolts are formed along the circumference of the flange part 63, but it should be understood that such is a mere example, and the shape and number of the bolt fastening bores 65 may be altered.

Further, the overlap part 67 may extend inward along the rear inner circumference of the protrusion part 61 and may be formed integrally with the protrusion part 61. The overlap part 67 may be coupled to the air-conditioner compressor 50 by a cover 53. In other words, the overlap part 67 may be formed to overlap a predetermined area with the cover 53 of the air-conditioner compressor 50, and thus, the cover 53 may strengthen a force fastening the overlap part 67 to the air-conditioner compressor 50.

Referring to FIG. 4, the stretch belt 81 may be mounted to the engine as follows. First at step S1, the guide member 60 may be mounted to a front center portion of an accessory, e.g., the air-conditioner compressor 50, to be connected to the damper pulley 10 mounted on the crankshaft 15 of the engine by the stretch belt 81. The stretch belt 81 may connect the damper pulley 10 and the air-conditioner compressor 50 in an endless track scheme. Then, a first end of the stretch belt 81 may be mounted on the damper pulley 10. In other words, an upper portion of a second end of the stretch belt 81 may be mounted to the air-conditioner compressor 50.

Particularly, the second end of the stretch belt 81 may be wound over a top portion of the pulley portion 51 of the air-conditioner compressor 50. Then, a lower portion of the second end of the stretch belt 81 may be spanned over a lower portion of the guide member 60 mounted to the front center of the air-conditioner compressor 50, in more detail, over a lower circumference of the protrusion part 61 of the guide member 60. Subsequently at step S2, the damper pulley 10 may be rotated, e.g., clockwise in the drawing.

By the rotation of the damper pulley 10, the top portion of the second end of the stretch belt 81 rotates together with the pulley portion 51 of the air-conditioner compressor 50 while maintaining the engaged state. Therefore, as the lower portion of the stretch belt 81 spanned over the protrusion part 61 moves to the left in the drawing, an installed range of the stretch belt 81 increases. Consequently, at step S3, after one rotation angle of the pulley portion 51 of the air-conditioner compressor 50, the stretch belt 81 is fully installed with the pulley portion 51 of the air-conditioner compressor 50.

An exemplary structure and method for belt installation of an engine for a vehicle has been described in connection with an example that the damper pulley 10 is connected to the air-conditioner compressor 50 by the stretch belt 81, it may be understood that any accessory may be applicable such structure and method for belt installation if the accessory is to be connected to the damper pulley by a stretch belt.

Therefore, when an accessory of the engine 1 is connected to the damper pulley 10 mounted on the crankshaft 15 of the engine 1 by the stretch belt 81 according to the structure and method for belt installation of an engine for a vehicle according to an exemplary embodiment, a stretch belt having high tension may be installed more easily. In other words, according to the structure and method for belt installation of an engine for a vehicle, a separate installation device, for example, an eccentric idler, and the like, may be eliminated, thereby reducing the number of required parts and assembly processes, and also reducing assembly time.

In addition, the structure and method for belt installation of an engine for a vehicle may be applicable any accessory to be connected by a stretch belt. By using a stretch belt together with an application of the structure and method for belt installation of an engine for a vehicle according to an exemplary embodiment, an extra installation device such as a tensioner may be eliminated.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

1: engine
10: damper pulley,
20: water pump
30: mild-hybrid integrated starter-generator
40: tensioner
50: air-conditioner compressor
51: pulley portion
53: cover
60: guide member
61: protrusion part
63: flange part
65: bolt fastening part
67: overlap part
70: first belt
80: second belt
81: stretch belt
83: outer lining
85: core wire

What is claimed is:

1. A structure for belt installation of an engine for a vehicle, comprising:
a damper pulley mounted to a crankshaft of the engine;
a stretch belt having a first end mounted on the damper pulley; and
an accessory mounted on the engine at a position spaced apart from the damper pulley,
wherein the accessory includes a pulley portion having a guide member on a front center thereof, and
wherein the guide member guides installation of the stretch belt to the pulley portion; and
wherein the guide member includes:
a protrusion part that protrudes in a circular ring shape at the front center of the accessory;
a flange part integrally formed with and extending outward along a rear outer circumference of the protrusion part, and contacting the accessory; and
a plurality of bolt fastening bores formed along circumference of the flange part and radially protruding from an outer circumference of the flange part.

2. The structure of claim 1, wherein the guide member has a same rotation center as the accessory.

3. The structure of claim 1, wherein the protrusion part has a protrusion width that extends from the front center of the accessory and that is greater than 0.5 times and less than a width of the stretch belt.

4. The structure of claim 1, wherein an outer diameter of the protrusion part is between about 0.6 times and 0.7 times of a diameter of the pulley portion of the accessory.

5. The structure of claim 1, wherein the guide member extends inward along a rear inner circumference of the protrusion part and is fastened to the accessory by a cover.

6. The structure of claim 1, wherein the stretch belt includes a core wire within an outer shell, and the core wire is made of an elastic fiber having elasticity.

7. The structure of claim 1, wherein a second end of the stretch belt is connected to an upper portion of the pulley portion of the accessory.

* * * * *